June 5, 1956 P. GǓMBERT 2,749,391
DEVICE FOR THE PURPOSE OF CLAMPING A FOIL, INSERTED INTO THE GAP FORMED BY BOTH OF THE POLE ENDS OF A SOUND TOP FOR MAGNETIC SOUND IMPLEMENTS
Filed May 22, 1952
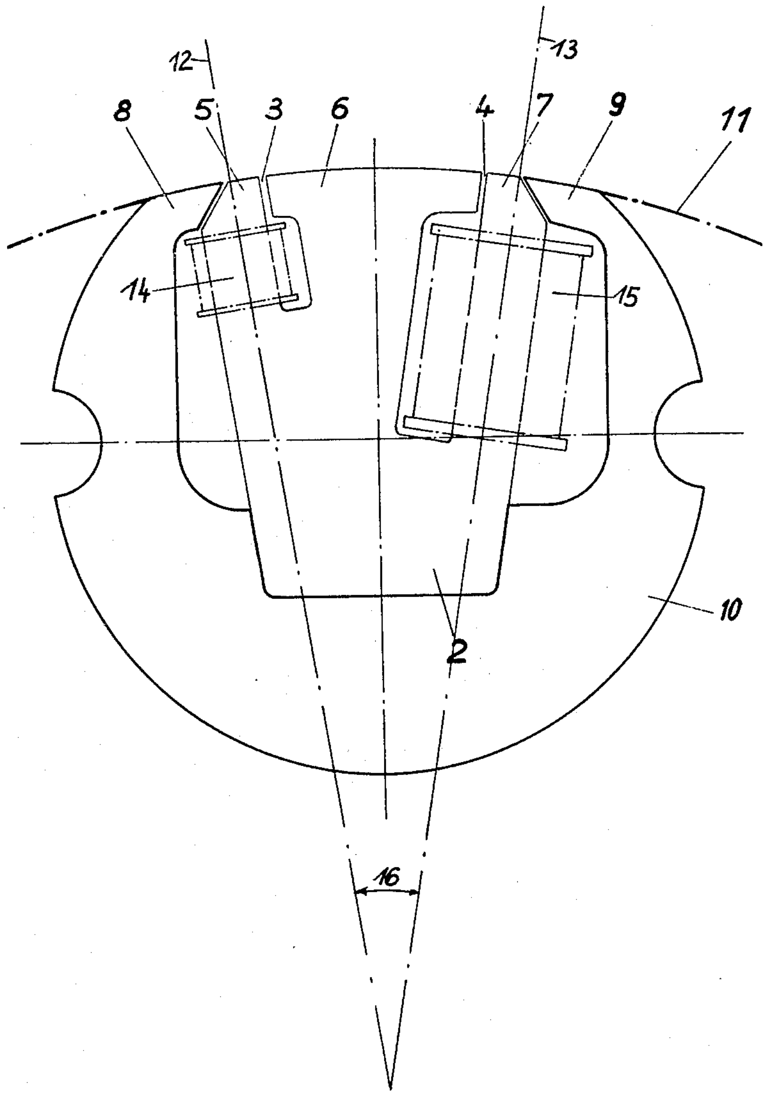
INVENTOR
P. GUMBERT
BY [signature]
ATTORNEY United States Patent Office 2,749,391

Patented June 5, 1956

2,749,391

DEVICE FOR THE PURPOSE OF CLAMPING A FOIL, INSERTED INTO THE GAP FORMED BY BOTH OF THE POLE ENDS OF A SOUND TOP FOR MAGNETIC SOUND IMPLEMENTS

Paul Gumbert, Pforzheim, Wurttemberg-Baden, Germany, assignor to International Standard Electric Corporation, New York, N. Y., a corporation of Delaware Application May 22, 1952, Serial No. 289,415

Claims priority, application Germany May 23, 1951

4 Claims. (Cl. 179—100.2)

The invention relates to a single core magnetic recording and reproducing head and more particularly to a device for clamping a foil into a gap formed by two ends of the core.

In accordance with the present invention, the device is characterized by providing a clip comprising a bifurcated non-magnetic relatively thick piece of sheet metal; the ends thereof serving as a running surface along which the record medium travels.

In accordance with the present invention, the clip material preferably has bearing metal properties, and is used as a running surface for the record medium. It has been found that soft bearing material provides the record medium, e. g. recording, wire with a lubrication, as it slides along the recording head, thereby greatly increasing its durability.

The clip according to the invention, at the same time provides a resilient support for the recording head.

In accordance with a further feature of the invention, if the record medium is arranged to pass the recording head in a circular movement, the coil carrying legs of the recording head are arranged in such a manner that the longitudinal axis of the legs are not arranged parallel towards each other but are arranged parallel to the slots and perpendicular to the circularly traveling record medium.

The drawing shows by way of example a schematic of a model of the invention in plan view. In this drawing, 2 represents the recording and reproducing head having gaps 3 and 4 and legs 5, 6 and 7; the record medium 11 slides past the top of said legs. Slots 3 and 4 are arranged perpendicular to the longitudinal axis of the record medium 11. The longitudinal axes 12 and 13 of coils 14, 15, in accordance with the invention, are placed parallel to the slots 3 and 4, consequently forming an angle 16. As may be seen from the drawing, coils 14 and 15 are therewith lying symmetrically towards the entire length of the slot.

Adjacent to the tops of legs 5 and 7, are leg-tops 8 and 9 of clip 10, which press the legs 5 and 7 inwardly and thus clamp the foils (not shown), inserted into the gaps 3 and 4. Before the record medium slides past the gaps 3 and 4, it passes over the relatively wide leg tops 8 and 9, respectively, and is lubricated thereby.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A magnetic recording head comprising a magnetic core having at least two leg portions separated by a gap, a foil mounted in said gap, means for clamping said foil firmly in said gap comprising a bifurcated resilient clamp member, the end portions of said clamp member pressing against the two legs of said core, and portions of said clamp member adjacent said leg portions defining a circular running surface for a recording medium, the running surfaces of said core and said clamp having a common center of rotation.

2. The device according to claim 1 wherein the running surfaces of the clamp member include means for lubricating the record medium as it travels therealong.

3. The device according to claim 2 wherein said lubricating means is inherent in the material of said clamp member.

4. The device according to claim 1, wherein said core comprises a base portion and three leg portions integral therewith, the center leg being substantially in the shape of a T, the respective ends of the lateral bar of said T forming a pair of gaps with the adjacent legs of said core, said outer legs being angularly disposed with respect to each other so that the axes thereof are perpendicular to the circular path.

References Cited in the file of this patent

UNITED STATES PATENTS

| | | |
|---|---|---|
| 2,456,767 | Camras | Dec. 21, 1948 |
| 2,555,110 | Bobb | May 29, 1951 |
| 2,587,097 | Berlant | Feb. 26, 1952 |
| 2,621,259 | Grantham | Dec. 9, 1952 |